United States Patent [19]

Harada et al.

[11] Patent Number: 5,119,118
[45] Date of Patent: Jun. 2, 1992

[54] CAMERA HAVING A DATA REGISTRATION DEVICE

[75] Inventors: Satoshi Harada; Tohru Horiuchi, both of Hachioji, Japan

[73] Assignee: Konica Corporation, Tokyo, Japan

[21] Appl. No.: 577,459

[22] Filed: Sep. 4, 1990

[30] Foreign Application Priority Data

Sep. 7, 1989 [JP] Japan ............... 1-232429

[51] Int. Cl.⁵ .............. G03B 13/02; G03B 17/24
[52] U.S. Cl. .................... 354/106; 354/219
[58] Field of Search .......... 354/105, 106, 107, 108, 354/109, 219

[56] References Cited

U.S. PATENT DOCUMENTS

| 896,020 | 7/1972 | Beach . | |
|---|---|---|---|
| 4,109,260 | 8/1978 | Fujita et al. | 354/106 |
| 4,110,766 | 8/1978 | Fujita et al. | |
| 4,193,676 | 3/1980 | Ueda et al. | 354/106 |

FOREIGN PATENT DOCUMENTS

| 0031568 | 7/1981 | European Pat. Off. . |
|---|---|---|
| 56-138731 | 10/1981 | Japan . |
| 1-246533 | 10/1989 | Japan . |

*Primary Examiner*—A. A. Mathews
*Attorney, Agent, or Firm*—Frishauf, Holtz, Goodman & Woodward

[57] ABSTRACT

A camera to record an identification data with a subject image. The identification data is superimposed on the subject image in an imprint area within a predetermined area of the photographic film, where the imprint area corresponds to the length of the identification data. A movable masking member masks the imprint area to decrease the luminance of the subject image therein. A controller of the camera determines a masking position of the mask member based on the number of characters of the identification data, and controls a driver to drive the masking member to the masking position. A finder masking member of the camera is linked to the film masking member, and masks an area of the view finder that corresponds to the imprint area of the film for indicating the imprint area in the view finder frame.

10 Claims, 11 Drawing Sheets

CAMERA HAVING A DATA REGISTRATION DEVICE

BACKGROUND OF THE INVENTION

The present invention relates to a camera having a data registration device.

A data registration device has been widely known by which the date and time are registered on a film from the back or the front of a camera. When the exposure condition of a portion of a film on which the data is registered, is not adequate for registering data, the data is not registered well. For that reason, a method has been also known in which a mask (a light reducing means or a light shielding means) is used so that the light projected on the portion of a film on which the data is registered, is shaded for the purpose of registering the data clearly.

On the other hand, various kinds of data have become to be registered lately, so that a camera has been put into practical use by which the name of a place where the photograph was taken and the name of a photographed subject can be registered in addition to the date of photographing. For example, the applicants proposed a camera (Refer to Japanese Patent Application No 73210/1988.) which is characterized in that: film winding is stopped a plurality of times while a film is wound by the length of a frame; and a predetermined data is registered when film winding has been stopped, so that a large amount of data can be registered with a device of simple composition. The comments which are registered by a camera are alphabetic letters, numerals, Japanese katakana letters, Japanese hiragana letters, and the like, for example, and a photographer can optionally register those letters within a limitation of number of letters. Consequently, the number of letters to register a comment is various, wherein it must be within a limitation.

When the above-described light reducing means is applied to this kind of camera according to the prior art, the mask is made in accordance with the limitation of the registered data. In that case, a portion of a screen is always covered by the longest mask even when only the date and time are registered and a comment is omitted, or even when a short comment is registered together with a date and time. Accordingly, the covered portion on the screen is unnecessarily longer than the portion in which the data is actually registered, so that the finished photograph does not look well and further the subject is unnecessarily covered by a mask.

SUMMARY OF THE INVENTION

The present invention has been achieved in order to solve the problems described above. The object of the present invention is to make a light reducing means function properly in a camera in which the number of registered letters can be optionally changed by a photographer. In order to attain the object, the portion covered by the light reducing means can be changed according to the number of letters to be registered. When the phrase of "the number of letters" is cited in this specification, it includes alphabetic letters, numerals, and symbols hereafter.

DETAILED DESCRIPTION OF THE INVENTION

Referring now to the drawings, the present invention will be described.

Figure 1:
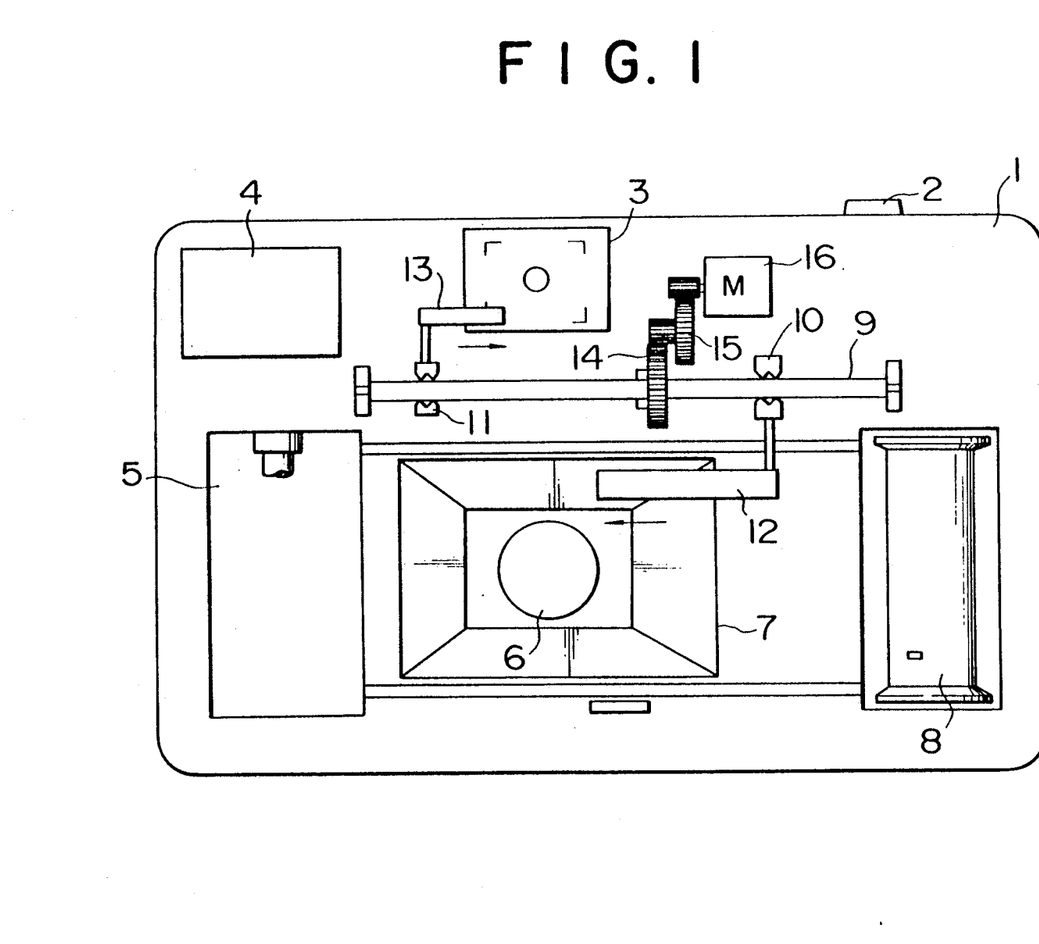
FIG. 1 is a schematic illustration of an example of a camera which is provided with the data registration device of the present invention.

FIG. 1 is a schematic illustration which shows the mechanism of the example of a camera having the data registration device of the present invention. In this case, the above-mentioned camera (Japanese Patent Application No. 73210/1988) is used as an example. We call this type of data registration "the data registration coupled with film winding type". However, it should be understood that the present invention is not limited to this type of data registration.

FIG. 1 is a view taken from the back of a camera, wherein the lid is not illustrated. The numeral 1 is a camera body. The numeral 2 is a release button. The numeral 3 is a view finder. The numeral 4 is a strobe light. The numeral 5 is a magazine chamber. The numeral 6 is an optical system for photographing. The numeral 7 is a screen window. The numeral 8 is a film winding reel.

The screw rod 9 is rotatably provided between the view finder 3 and the screen window 7. The nuts 10,11 are screwd to the screw rod 9. The mask 12 which is a light reducing means, is provided to the nut 10 through a connecting rod. When the data is registered, the mask 12 is protruded into the screen window 7 in order to shield or reduce the light of a photographic object. In the same way, the mask 13 is provided to the nut 11 through a connecting rod, wherein the mask 13 is a light reducing means. The mask 13 is linked with the mask 12 and protruded into the view finder 3 in order to indicate the position of the mask 13 in the photographing screen. The masks 12,13 are made from film material, for example, with flexibility which can shield or reduce light. It is necessary to select an adequate material, taking the function of each mask into consideration.

The gear 14 is fixed to the screw rod 9, and the gear 14 is connected with the stepping motor 16 through the transmission gear 15. When the motor 16 is driven in the normal direction, the screw rod 9 is rotated and the masks 12,13 are moved in the direction of the arrow in FIG. 1 so that they can be protruded. When the motor 16 is driven in the reverse direction, the masks are moved so that they can be withdrawn. When the masks are not necessary, they are moved to the withdrawal position (the initial position) which can be detected by a sensor not illustrated in the drawing, and they kept waiting at the position.

Figure 2:
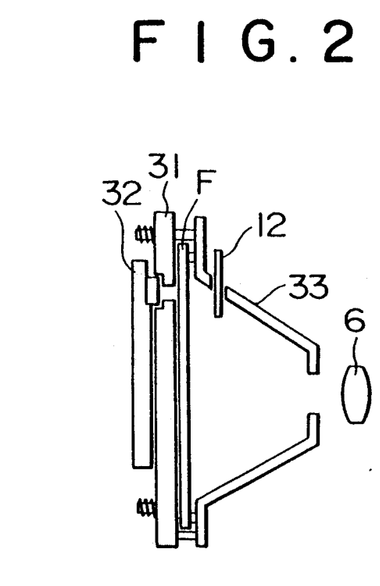
FIG. 2 is a partial sectional side view of a camera illustrated in FIG. 1.

FIG. 2 is a sectional view which shows the state of a camera in which a film is loaded. The data registration portion which is located on the back of film F, is irradiated by the light sent from the data registration module 32 through a hole provided to the pressure plate 31. At this moment, the mask 12 is protruded into the light shielding window 33 as illustrated in the drawing so that the light of a photographic object projected on the data registration portion of the film, can be shielded or reduced.

Figure 3:
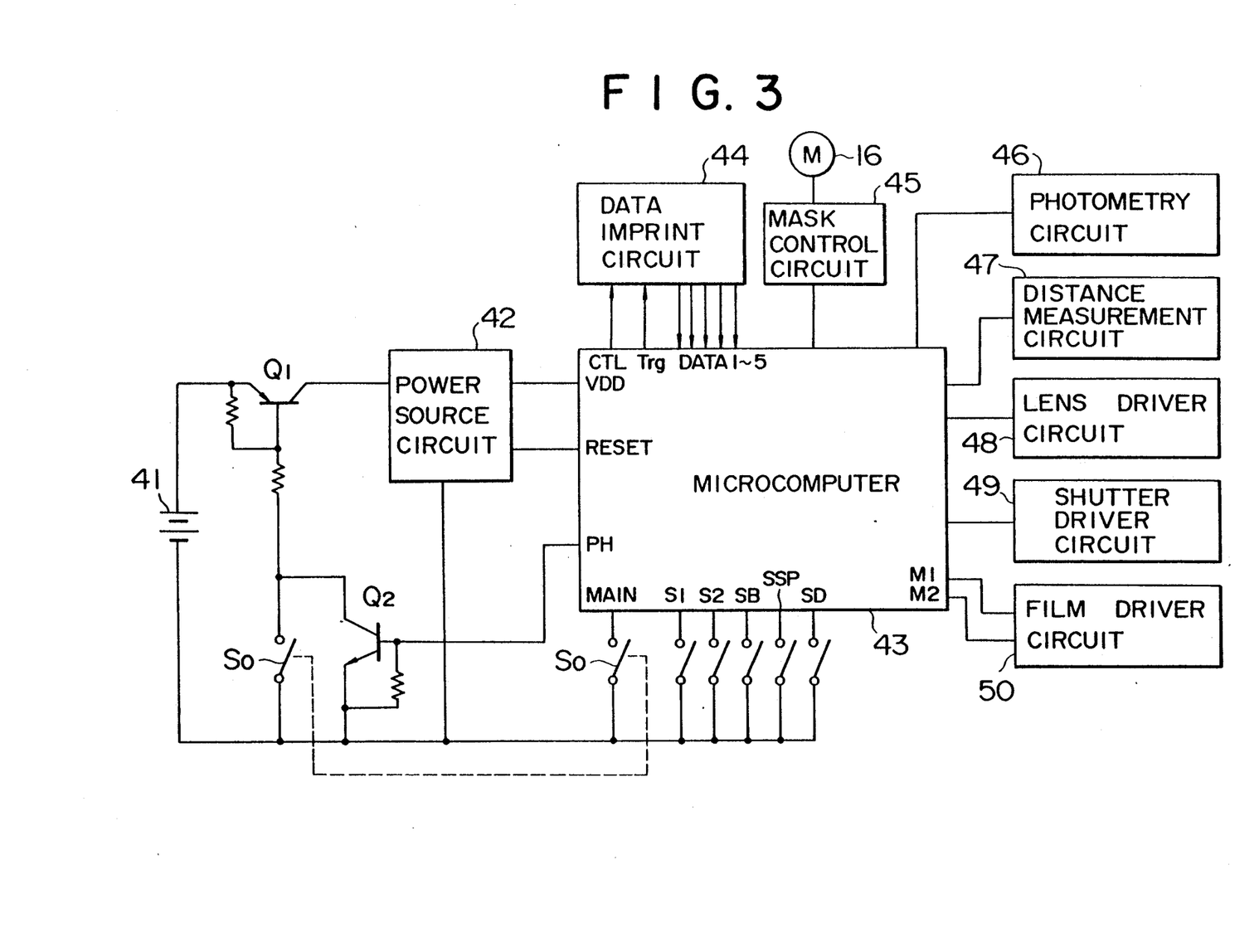
FIG. 3 is a block diagram which shows the circuit of a camera illustrated in FIG. 1.

FIG. 3 is a block diagram which shows the outline of the electrical circuit of the example the of the present invention. When the main switch $S_0$ is turned on, transistor $Q_1$ is excited and electric power is supplied from the battery 41 to the power source circuit 42, so that a constant voltage and a reset signal can be impressed on the microcomputer 43. The output terminal PH of the microcomputer 43 is connected with the base of transistor $Q_2$, and when the signal of H level is outputted from PH, transistor $Q_2$ is excited and transistor $Q_1$ is excited having no relation to switch $S_0$, so that the electrical power supply to microcomputer 43 is self-held.

The numeral 44 is a data registration module, notated as data imprint circuit in the figure, the detail of which will be explained later. A signal to control the motion of the data registration module 44 is outputted from the output terminal CTL of the microcomputer 43. In the case of CTL=0, the data registration can be conducted, and in the case of CTL=1, the data registration is prohibited. The data registration is conducted according to a trigger signal sent from the trigger terminal of the microcomputer 43. The numeral 45 is a mask control circuit by which the stepping motor 16 is controlled. The numeral 46 is a photometry circuit by which the luminance of the photographic object can be measured. The numeral 48 is a lens drive circuit by which the photographing optical system is moved according to the results of distance measurement. The numeral 49 is a shutter control circuit by which the shutter is opened and closed and the shutter opening period can be controlled. The numeral 50 is a film winding control circuit by which film winding and rewinding can be controlled.

Concerning switches, $S_1$ and $S_2$ are two-step-type switches. When the release button 2 is pressed by one step, $S_1$ is turned on and when the release button 2 is further pressed, both of $S_1$ and $S_2$ are turned on. SB is a switch which is turned on when the lid of a camera is closed, and which is turned off when the lid is opened. SSP is a switch which is turned on and off according to film winding. SSP outputs two pulses of ON,OFF when the film is wound by the length of a frame, and outputs one pulse of ON,OFF when the film is wound by the length of half a frame. SD is a switch which is turned on when the device is in the data registration mode.

The data registration module 44 is provided to the lid of the camera and composed of the processing circuit for the date and comment data, the light source and LCD for data registration, the microcomputer, the inputting unit, another LCD for displaying the comment data, and the like.

Figure 4:
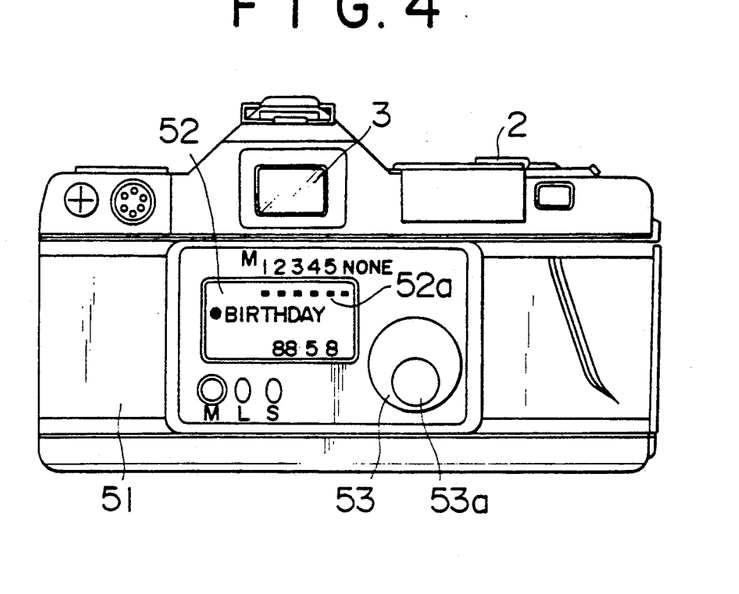
FIG. 4 is a rear view of the camera illustrated in FIG. 1.

FIG. 4 is a drawing which illustrates the appearance of the camera, the lid of which is equipped with the module described above. The lid 51 is provided with the displaying LCD 52, the dial 53, and the key switches M,L,S. The numeral 52a are six comment number displays which are provided to the upper portion of the displaying LCD 52. The date or the time and comment are displayed on LCD 52. The storage in the microcomputer installed in the module can store 5 kinds of comments from the first to the fifth, and the stored comment can be retrieved by the operation of the comment selection key M. Namely, every time the comment selecting key M is pressed, the comment is displayed on the displaying LCD 52 in the numeral order, and at that time the comment number display 52a g is lit so that the number of the comment which is being displayed can be indicated. When the comment number display display 52a is set at the position of "NO", the comment is not displayed and the comment is not registered either.

The dial 53 is used for inputting numerals, characters, and marks. When the dial 53 is rotated clockwise while the cut-out portion 53a is pressed by a finger, the numerals, the letters, and the marks are changed into numerical or alphabetical order so that they are displayed on the LCD 52. When the dial 53 is rotated counter-clockwise, the numerals, the letters, and the marks are changed into reverse order. The inputted characters are not limited to the characters described above. Japanese hiragana characters or Japanese katakana characters may be displayed. The date and comment displayed on the LCD 52 are registered on a film by the LCD for use in registration which is installed in the module.

The LCD for use in registration can register 10 letters, for example, at once. In the case of the registration system coupled with film winding, when a film is wound by the length of half a frame, the registration of 10 letters is further conducted. For that reason, 20 characters can be registered in a frame in total. Accordingly, there are 4 patterns of data registration which will be described as follows.

Figure 5A:
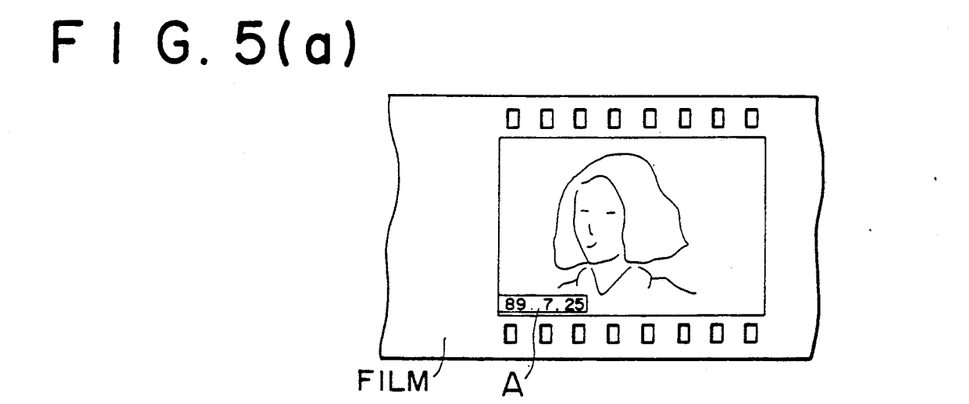
FIG. 5(a) and FIG. 5(b) are drawings which show the portion on a film which is covered by a light reducing means.
Figure 5B:
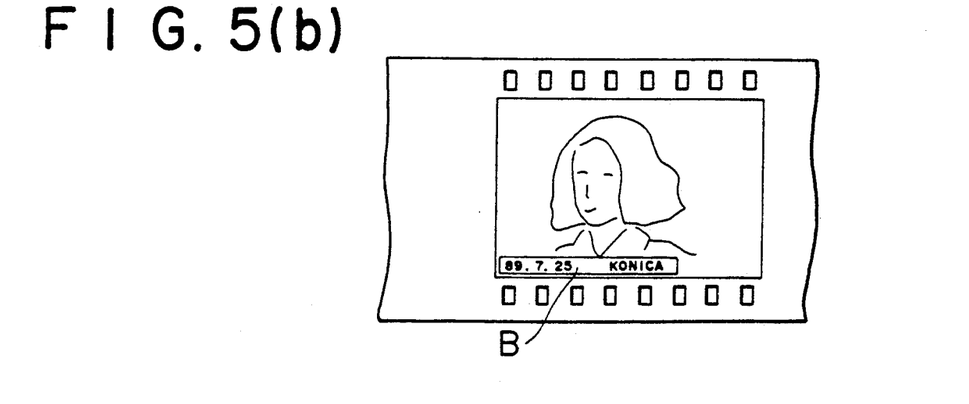

(1) Only comment 1 to 10 characters
(2) Only date
(3) Only comment 11 to 20 characters (double comments)
(4) Combination of the comment of 1 to 10 characters and date The patterns (1) and (2) are the same as the conventional registration system. In the patterns (1) and (2), the registration is conducted in such a manner that: after released, the comment or the date is registered; and then the film is wound by the length of a frame. The date is registered on the film as illustrated in FIG. 5(a). The patterns (3) and (4) are peculiar to the registration system coupled with film winding. After release, the comment or the date is registered and then the film is wound by the length of half a frame. When film winding has been stopped, the comment is further registered. In the case of the pattern (4), the registration is conducted as illustrated in FIG. 5(b).

The following signals which are concerned with the kind of data, are sent from the registration module 44 to the data terminals D1 to D5 of the microcomputer 43 installed in the camera body.

| Data terminal 5 4 3 2 1 | Kind of data | |
|---|---|---|
| 0 0 0 0 0 | Number of characters in a comment | 1 |
| 0 0 0 0 1 | Number of characters in a comment | 2 |
| 0 0 0 1 0 | Number of characters in a comment | 3 |
| . | . | . |
| . | . | . |
| . | . | . |
| 0 1 0 0 1 | Number of characters in a comment | 10 |
| 0 1 1 0 0 | Date (year, month, and day) | |
| 0 1 1 0 1 | Date (month, year, day) | |
| 0 1 1 1 0 | Date (day, hour, minute) | |
| 1 0 0 0 0 | Number of characters in double comments | 11 |
| 1 0 0 0 1 | Number of characters in double comments | 12 |
| 1 0 0 1 0 | Number of characters in double comments | 13 |
| . | . | . |
| . | . | . |
| 1 1 0 0 1 | Number of characters in double comments | 20 |
| 1 1 1 0 0 | Comment and Date (year, month, and day) | |
| 1 1 1 0 1 | Comment and Date (month, year, and day) | |
| 1 1 1 1 0 | Comment and Date (day, hour, and minute) | |

Referring now to the flow chart in FIG. 6, an example will be explained.

First of all, the main switch $S_0$ is turned on, and then the output "1" is outputted at the output terminal PH of the microcomputer 43 (F-1) so that the power source is self-held. Then, where the lid is operated or not is checked by the switch SB (F-2). When the lid is opened, the output "1" is outputted at the output terminal CTL of the microcomputer 43 (F-3), so that registration motions are prohibited. When the masks 12,13 are not at the withdrawal positions at this moment, the motor 16 is reversed so that the marks can be withdrawn (F-4). The reason to withdraw the mask can be described as follows. When the lid is opened and the masks are protruded, there is a fear that the masks may contact with a user's finger or the masks may be caught by the leading edge of a film and they may be damaged. Therefore, the masks are withdrawn in order to prevent such a problem.

When the lid is closed at the step of (F-2), the state of the switch SD is checked (F-5). When it is in the state of ON, "0" is outputted at the output terminal CTL of the microcomputer 43 (F-6) so that the registration mode is set. Then, it is checked whether there is a change or not in the character number data sent from the module (F-7). When there is a change, the mask is controlled according to the change of data (F-8). For example, when the number of characters is increased, the drive pulse corresponding to the amount of the increase is outputted from the mask drive circuit and the motor 16 is rotated in the normal direction so that the mask can be protruded correspondingly to the amount of the increase in the number of characters. On the contrary, when the character number is decreased, the mask is withdrawn correspondingly to the amount of the decrease. To sum up, the operation is conducted so that the length of the mask can coincide with the number of characters.

When the release button 2 is pressed and S1 is turned on (F-9), distance measurements and photometry are conducted (F-10). Then the state of the switch S2 is checked (F-11). When the switch S2 is in the state of OFF, S1 is checked (F-12). When both S2 and S1 are in the state of OFF, the process is returned to the step (F-9). When S2 is in the state of ON at the step of (F-11), the lens is driven according to the result of distance measurement (F-13), and further the shutter is driven (F-14) so that the film is exposed. Successively, the subroutine of data registration and film winding is carried out (F-15).

Figure 7:
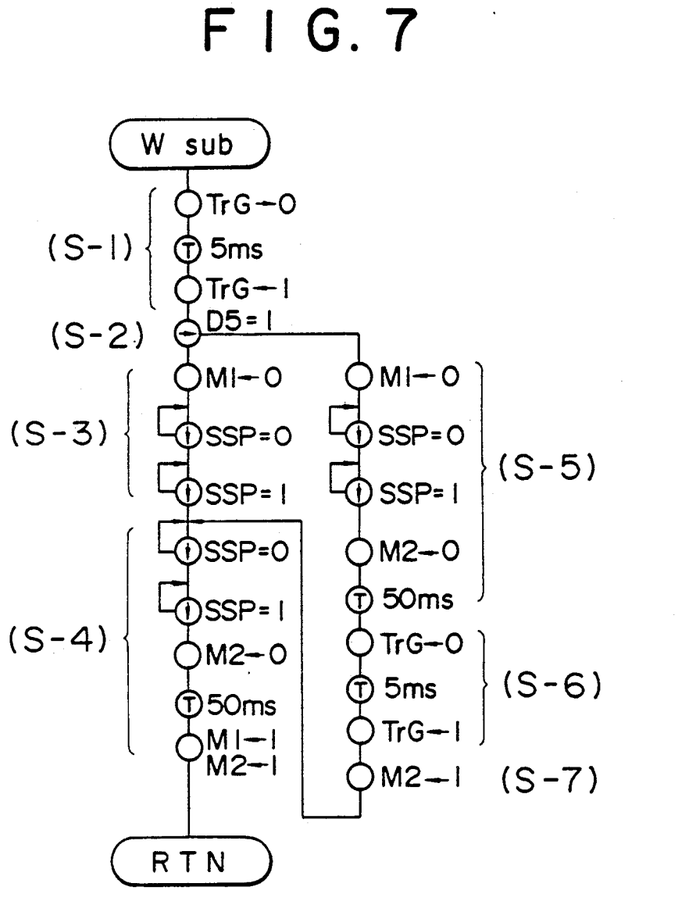

FIG. 7 shows the details of the subroutine of the step (F-15). The marks used in this flow chart are defined as follows.

① ... Judgement: When the condition described next to this mark is satisfied, the process proceeds to the arrowed direction.

○ ... Processing: Processing described next to this mark is conducted.

(t) ... Timer: The process is kept waiting for the period described next to this mark.

M1 and M2 are output terminals on the microcomputer side, wherein the microcomputer controls the film winding circuit 49. The control shown in the following table is conducted according to the output signal sent from the terminals.

| M1 | M2 | Control |
|---|---|---|
| 1 | 1 | Motor is stopped. |
| 0 | 1 | Motor is rotated in the normal direction. |
| 0 | 0 | Brake |

First of all, at the step (S-1), the trigger signal is outputted to the data registration module 44 and data registration is conducted. Whether the operation is the registration coupled with winding or not is judged according to the signal which is sent from the registration module 44 and inputted to the data terminal 5 of the microcomputer 43 at the step (S-2). In other words, according to the table shown in page 11, it can be judged that: when D=1, the mode is the registration coupled with winding; and when D5=0, the mode is the normal registration. When D5=0 at the step (S-2), the film is wound by the length of half a frame (S-3), and further half a frame of a film is successively wound (S-4), and so that the film is wound by the length of a frame after all. When the mode is in the film winding coupled with registration, wherein D5=1 in the step (S-2), at first the film is wound by the length of half a frame, and then the rest data is registered (S-6). After that, the film is further wound by the length of half a frame (S-7, S-4).

Figure 6:
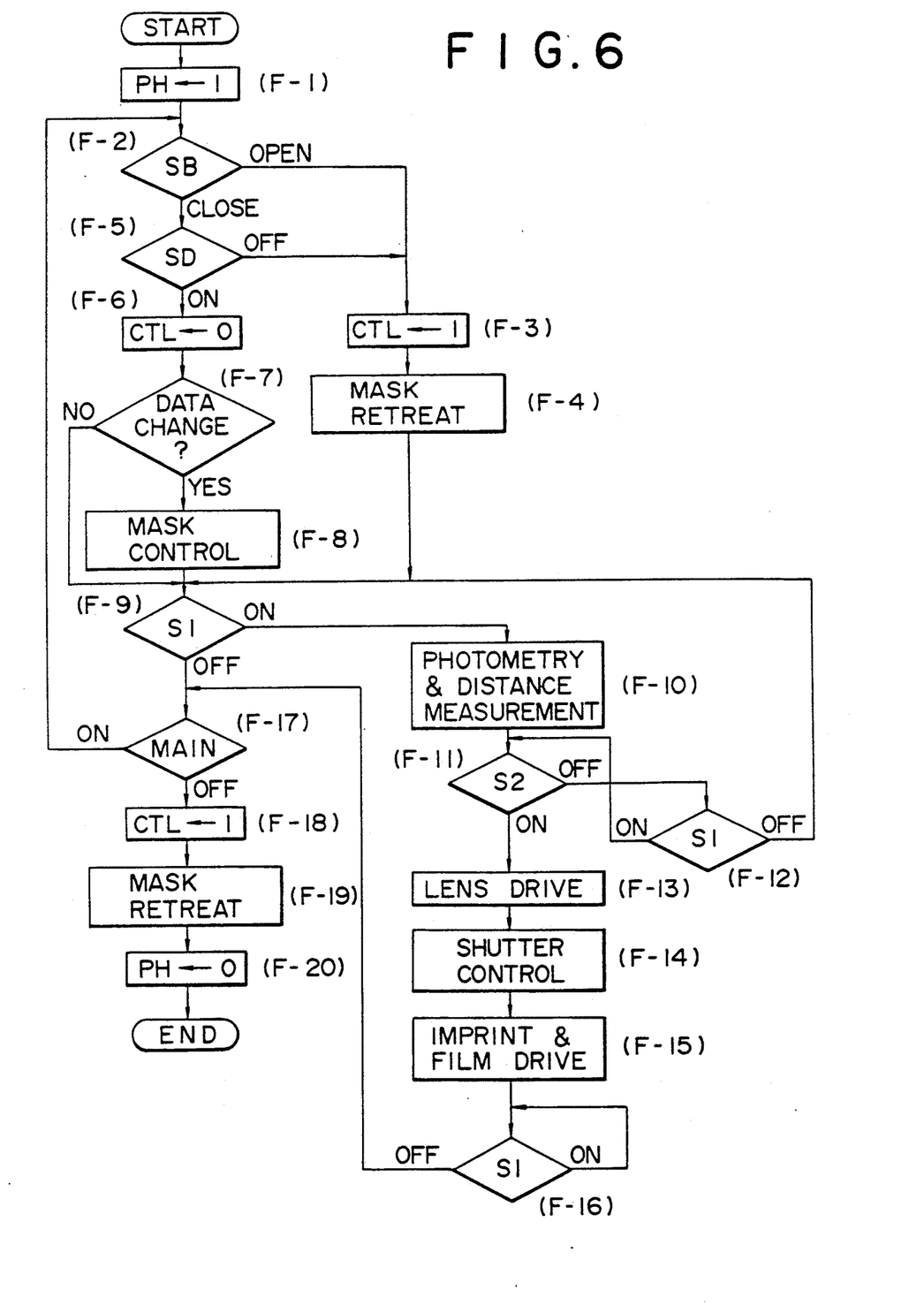
FIG. 6 and FIG. 7 are flow charts which explain the motions of the example.

Referring now to FIG. 6, the switch S1 is checked at the step (F-16). When the switch $S_1$ is in the state of OFF, the main switch $S_0$ is checked (F-17). When the main switch $S_0$ is in the state of ON, the process is returned to the step (F-2). However, when the main switch S: is in the state of OFF, the output terminal CTL of the microcomputer 43 is set to "1" (F-18) so that the registration mode can be released. The motor 16 is reversed so that the mask can be withdrawn (F-19), and the terminal PH of the microcomputer 43 is set to "0" (F-20) so that the power source is shut off. The reason why the mask is withdrawn when the main switch is in the state of OFF, is as follows. When the mask is left protruded, the following problem will occur: when the lid is opened while the main switch is shut off, the microcomputer 43 is not started in this example, so that the mask is left protruded and it may be damaged. In this example, the steps (F-4) and (F-19) are carried out, so that the mask is set in the state of withdrawal when the lid is opened by a user.

Figure 8A:
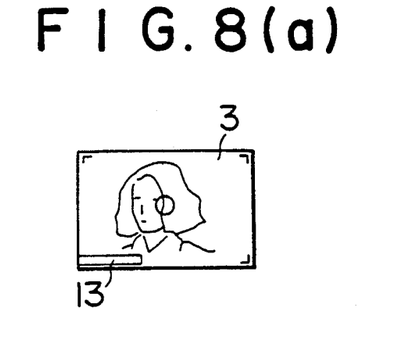
FIG. 8(a) and FIG. 8(b) are drawings which show a display in a view finder.
Figure 8B:
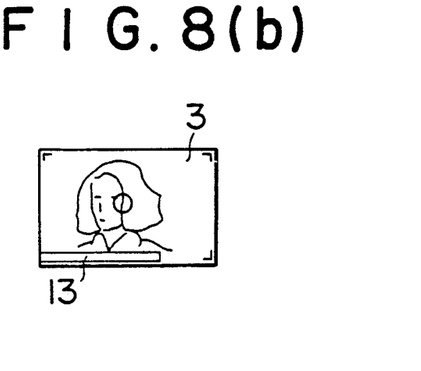

Since the example of the present invention is composed in the way described above, it has an advantage: when only the date information is registered, for instance, the light of the subject projected on the portion "A" where the date is registered, is shaded or decreased as illustrated in FIG. 5(a), so that the date information can be clearly observed. At the same time, as illustrated in FIG. 8(a), the mask 13 which indicates the shaded portion in a view finder, appears. Accordingly, a photographer can know the shaded portion on the screw, which is convenient when framing is conducted. Even when the length of characters to be registered, varies, the mask is controlled and the shaded portion is changed as illustrated in FIG. 5(b) so that it coincides with the length of characters. The mask 13 in the view finder is changed in the same way so that it can indicate the shaded portion as illustrated in FIG. 8(b).

Figure 9A:
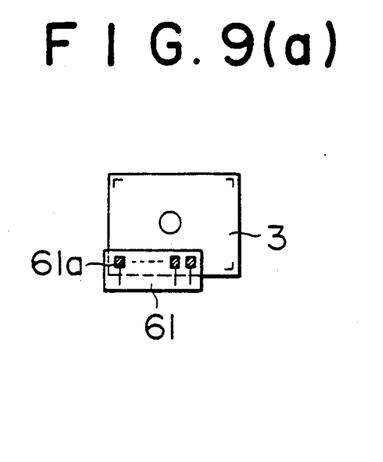
FIG. 9(a), FIG. 9(b), and FIG. 9(c) are drawings which illustrate the second example of the present invention.
Figure 9B:
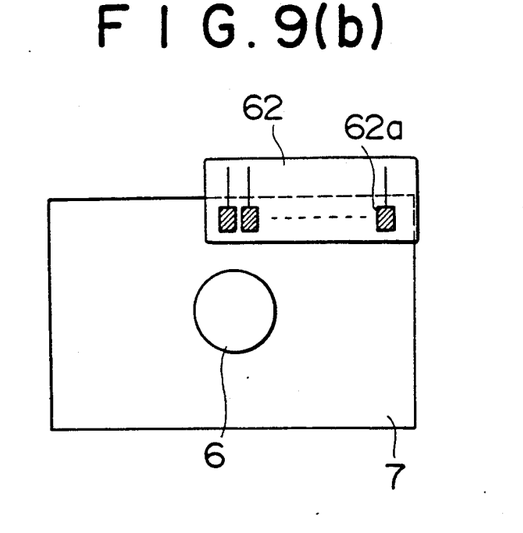
Figure 9C:
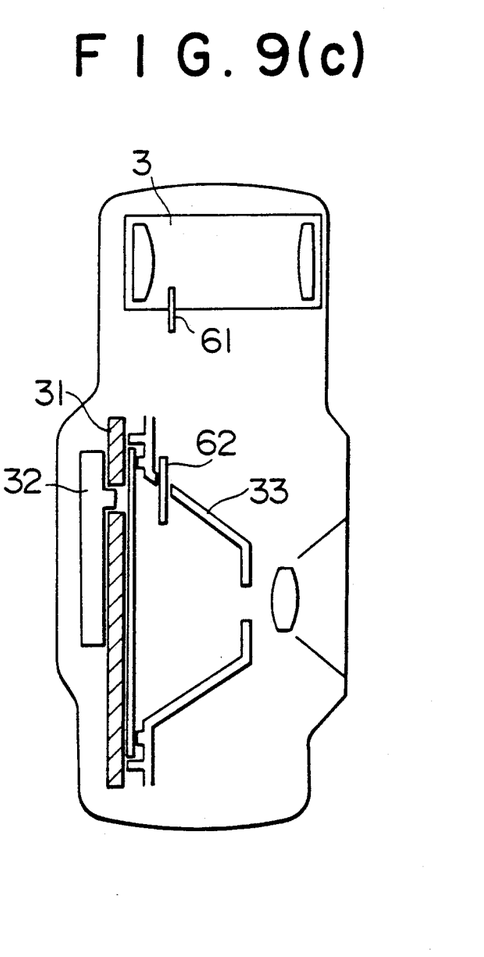

In the example described above, a film member is used as the masks 12,13. However, LCD (a liquid crystal display) may be used in place of the film member described above. An example is shown in FIGS. 9(a), 9(b), and 9(c). FIG. 9(a) shows a LCD for use in a view finder. FIG. 9(b) shows a LCD for use in a picture frame. FIG. 9(c) shows the arrangement of each LCD in a camera. Referring now to the drawings, like reference characters designate corresponding parts throughout several views. LCD 61 and LCD 62 are composed of a plurality of segments 61a,62a. The segments, the number of which corresponds to the number of characters to be registered, are activated, and in the case of LCD 62 the light of the subject is shaded or decreased and LCD 61 displays the portion in the view finder, wherein the light projected on the portion is shaded or decreased by LCD 62.

Figure 10:
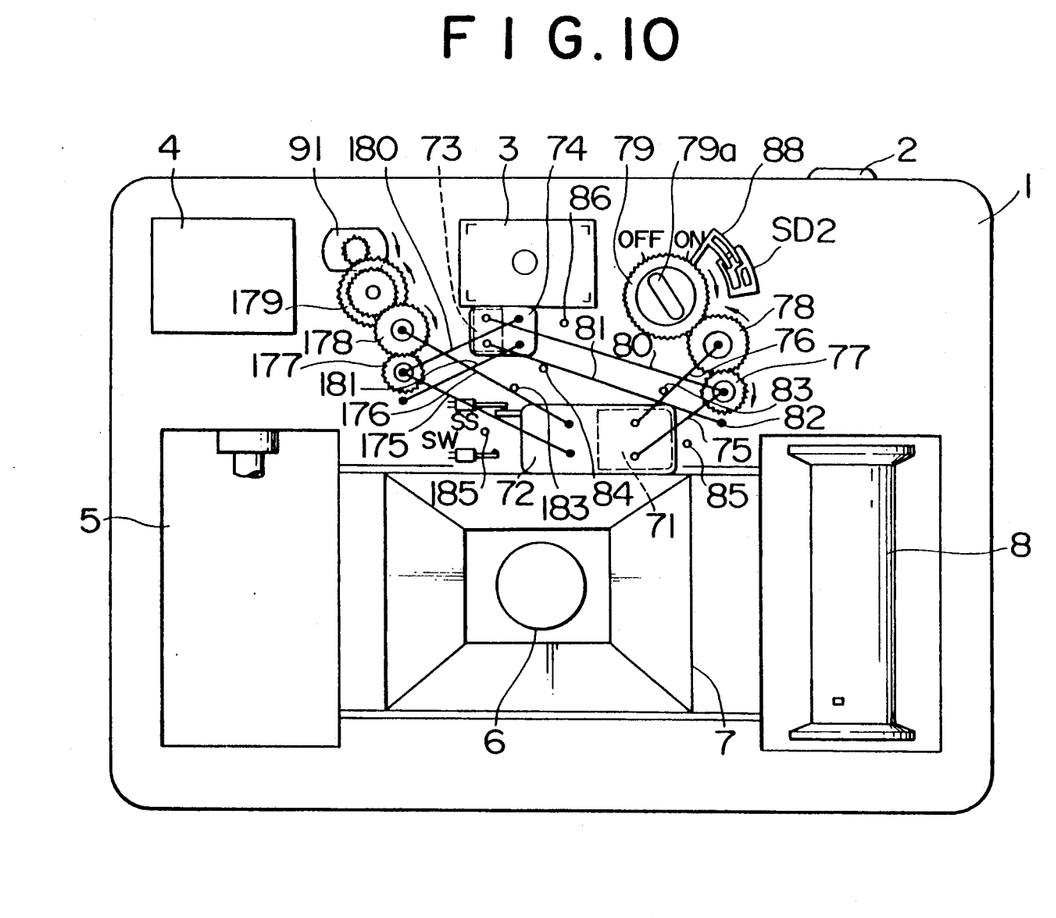
FIG. 10, FIG. 11, and FIG. 12 are schematic illustrations which show different embodiments of the mechanism of the second example.
Figure 11:
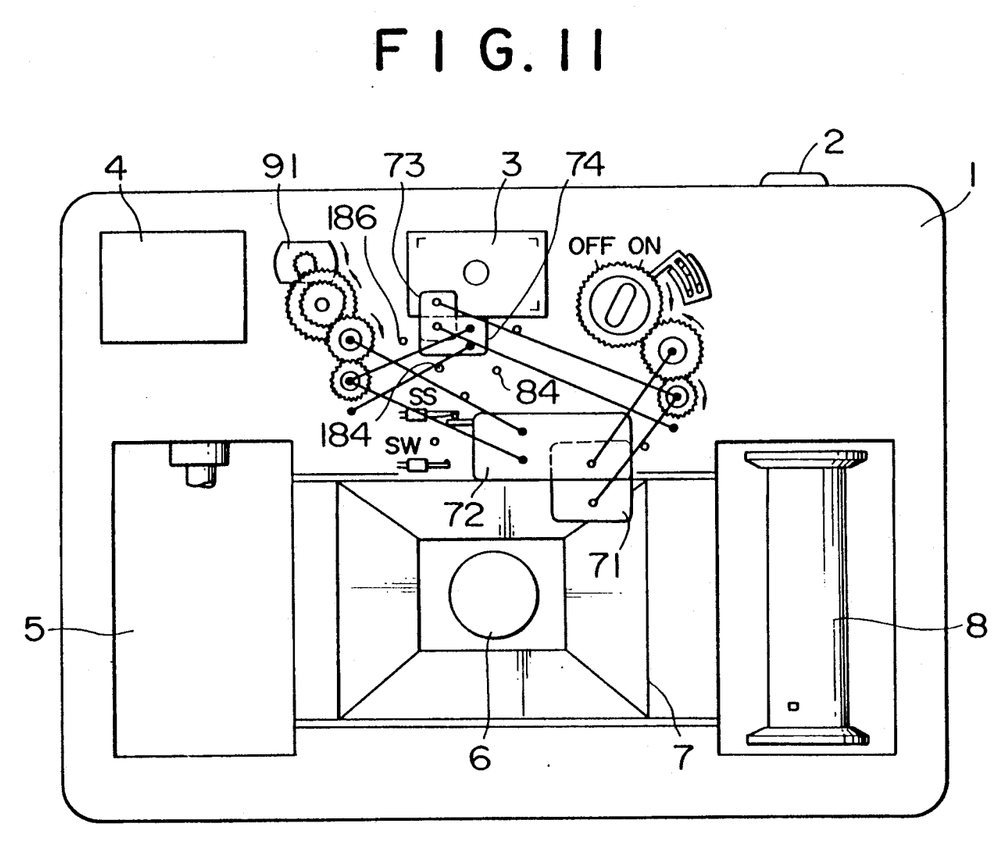
Figure 12:
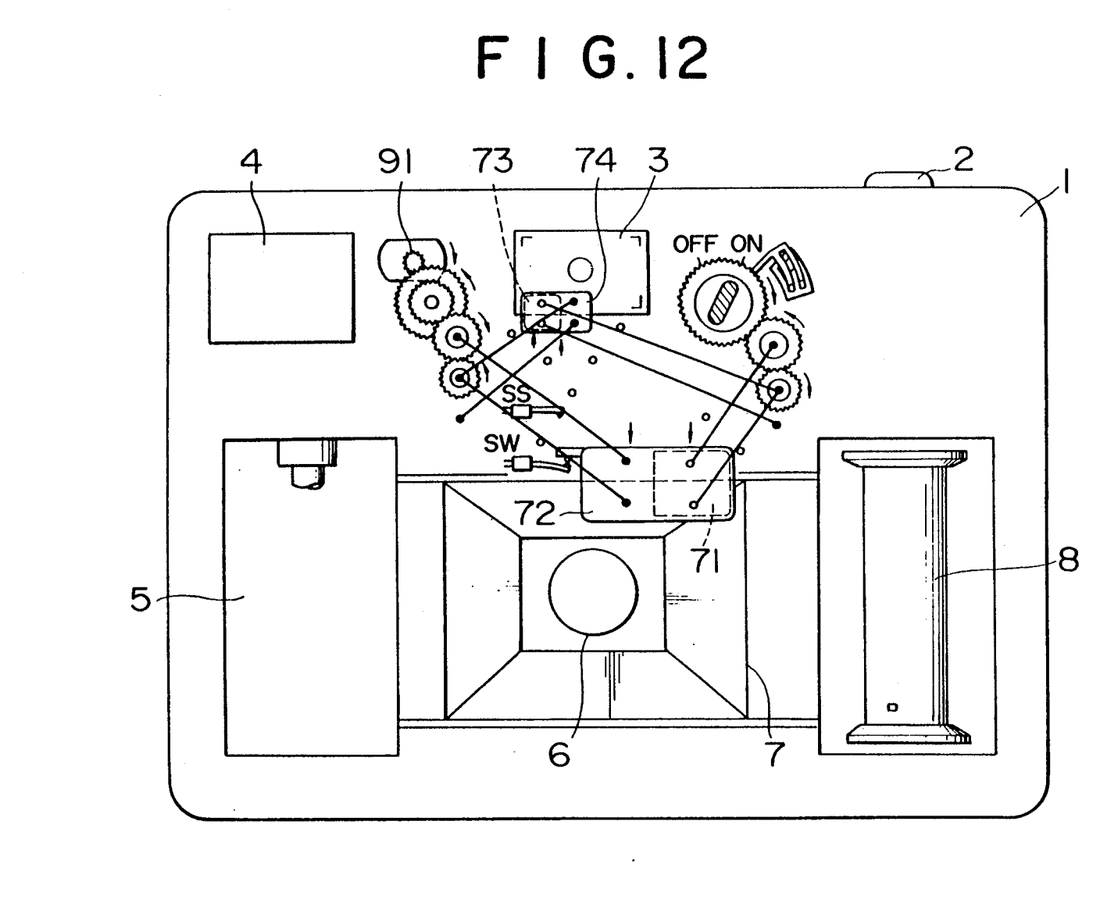

FIG. 10, FIG. 11, and FIG. 12 show another example of the present invention. In the drawings, like reference characters designate corresponding parts throughout several views.

In the case of the first example, the mask is extended and shrunk in accordance with the number of characters. However in this example, two masks, one is the short mask 71 and the other is the long mask 72, are provided. When the data registration is not conducted, both masks 71,72 are withdrawn toward the upper portion of the image frame 7. When the mode is in the data registration in which the registration coupled with film winding is not conducted, only the mask 71 is protruded in the image screen as illustrated in FIG. 11. When the registration coupled with film winding is conducted, both masks 71,72 are protruded as illustrated in FIG. 12. In the same way as the case illustrated in FIG. 2, the masks 71,72 are protruded into the exposure portion from the slits provided to the shading frame 33. Being coupled with the motions of the masks 71,72, the short mask 73 for use in the normal data registration and the long mask 74 for use in the data registration coupled with film winding, come in and out from the view finder 3.

The mask 71 is connected with the shafts of the gears 77,78 through the links 75,76 which are provided in parallel with each other. (The links are illustrated by straight lines in FIG. 10 to simplify the explanation.) The gear 77 and the gear 78 are engaged, and further the gear 78 is engaged with the gear 79. The gear 79 is provided with the knob 79a which is used to rotate the gear 79 manually. The mask 73 provided to the view finder 3 is connected with the shaft of the gear 77 and the boss 82 provided to the camera body through the links 80,81 which are parallel with each other.

Figure 13:
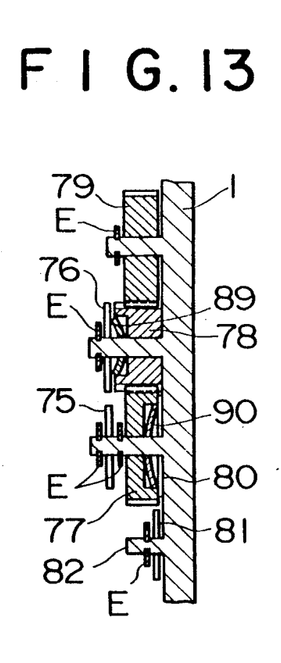
FIG. 13 is a sectional view which illustrates the structure of the combination of links and gears in the second example.

FIG. 13 is a sectional view which shows the combination mechanism between the gears and the links. The numerals 89,90 are friction springs. The link 76 is frictionally connected with the gear 78 by the action of the friction spring 89. The link 75 is rotatably provided to the shaft of the gear 77. The link 80 is frictionally connected with the gear 77 by the action of the friction spring 90. The link 81 is rotatably provided to the boss 81. The character E is an E-ring which is used for installing a gear or a link. When the knob 79a is rotated so that it comes to the position ON, the gears 79,78,77 are rotated in the direction of the arrow in FIG. 10 and the links 76,80 are rotated by the gears, wherein the links are frictionally connected with the gears. Therefore, the masks 71,73 are protruded as illustrated in FIG. 11.

The numerals 83,84 are stoppers which restrict the withdrawing movement of the links 76,81. The numerals 85,86 are stoppers which restrict the protruding movement of the links 75,80. The protruded masks 71,73 are stopped by the action of the stoppers 85,86. When the gear 79 is overloaded at this moment, the load is absorbed by the action of the above-described frictional coupling.

SD2 is a pattern switch which is used for changing the mode to the data registration mode. The switch SD2 is turned on and off by the movement of the sliding member 88 provided to the gear 79. When the knob 79a is rotated so that the gear 79 is set to the position ON, the switch SD2 is set to the data registration mode and at the same time the masks 71,73 are protruded.

The drive mechanism of the masks 72,74 is provided on the opposite side of the above-described mechanism with regard to the view finder 3. The drive mechanism is essentially the same as the mechanism explained before. Namely, the links 175, 176, 180, and 181 respectively correspond to the links 75, 76, 80, and 81. The gears 177, 178, and 179 respectively correspond to the gear 77, 78, and 79. Furthermore, the stoppers 183 to 186 correspond to the stoppers 83 to 86, and the boss 182 corresponds to the boss 82. Although the mask 71 is manually driven, in the case of the mask 72 the gear 179 is driven by the motor 91.

The withdrawal of the mask 72 is conducted by the switch SS and its protrusion is conducted by the switch SW. FIG. 10 and FIG. 11 show the state in which the mask 72 is at the withdrawal position. (SS=NN) When the motor 91 is rotated in the normal direction, the gears 179, 178, and 177 are rotated in the direction of the arrow illustrated in the drawing so that the masks 72 and 74 are protruded as illustrated in FIG. 12. (SW=ON).

Figure 14:
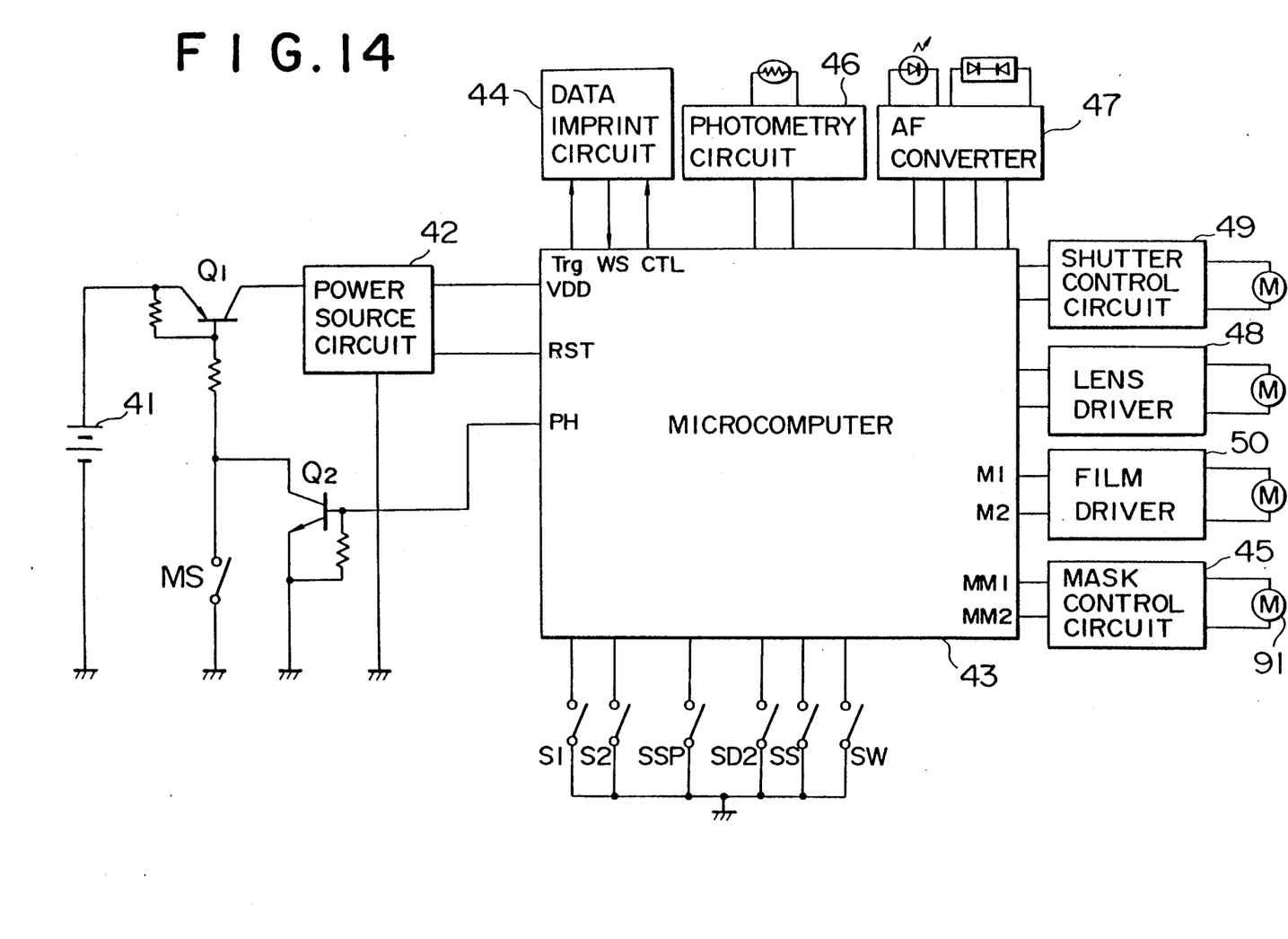
FIG. 14 is a block diagram which shows the circuit of the second example.

FIG. 14 is a block diagram which shows the circuit of the second example. Like reference characters designate corresponding parts throughout the drawings. In the drawing, a signal which indicates whether the mode is the data registration coupled with film winding or not, is sent to the input terminal WS of the microcomputer 43 from the data registration module 44. When WS=0, the mode is the data registration coupled with film winding, and when WS=1, the mode is the normal data registration.

Referring now to the flow chart illustrated in FIG. 15, the motions of the second example will be described. The reference characters used in the flow chart are the same as those used in FIG. 7, and further the following new characters are used in the flow chart.

⊚ ... Subroutine: The subroutine described on the right side of the character is carried out.

The state of ON of each switch is represented by "0" and the state of OFF is represented by "1". The step number is put to each step, wherein the step number is distinguished by the parenthesis ( ).

At the outset, the main switch MS is turned on. Then "1" is outputted at the output terminal PH of the microcomputer 43 (1), and the power source is self-held. At the next step, the state of the switch SD2 is checked (2). When SD2=0, "0" is outputted at the output terminal CTL of the microcomputer 43 (3) so that the mode is set to the data registration mode. When SD2=1, the switch SS is checked (4). When SS=1, it can be judged that the mask is protruded although the mode is not the data registration, so that the motor 91 is driven in order to withdraw the mask 72 (5) and the output terminal CTL is changed to "1" (6). At the next stage, whether WS=0 or not, in other words, whether the mode is the data registration coupled with film winding or not, is checked (8), and when SW=1, the mask 72 is not protruded, so that the motor 91 is driven and the mask 72 is protruded (9). When WS=1 at the step (7), in other words, when the mode is not the data registration coupled with film winding, the switch SS is checked (10). When SS=1, the mask 72 is protruded, so that the motor 91 is driven and the mask 72 is withdrawn (11).

After the mask control has been completed, the ordinary photographing sequence is conducted. Namely, when S1 is turned on (12), photometry (13) and distance measurement (14) are conducted. Then the switch S2 is turned on (15), the lens is driven according to the result of distance measurement (16), the shutter is driven (17) so that exposure is conducted, the lens is returned to the original position (18), and the film is wound.

At the step (19), the same subroutine as that of the first example illustrated in FIG. 7 is conducted. Although in the case of FIG. 7, the input terminal D5 of the microcomputer was checked at the step (S-2), in this example, whether the mode is the data registration coupled with film winding or not, is judged according to the input terminal WS of the microcomputer 43.

Figure 15:
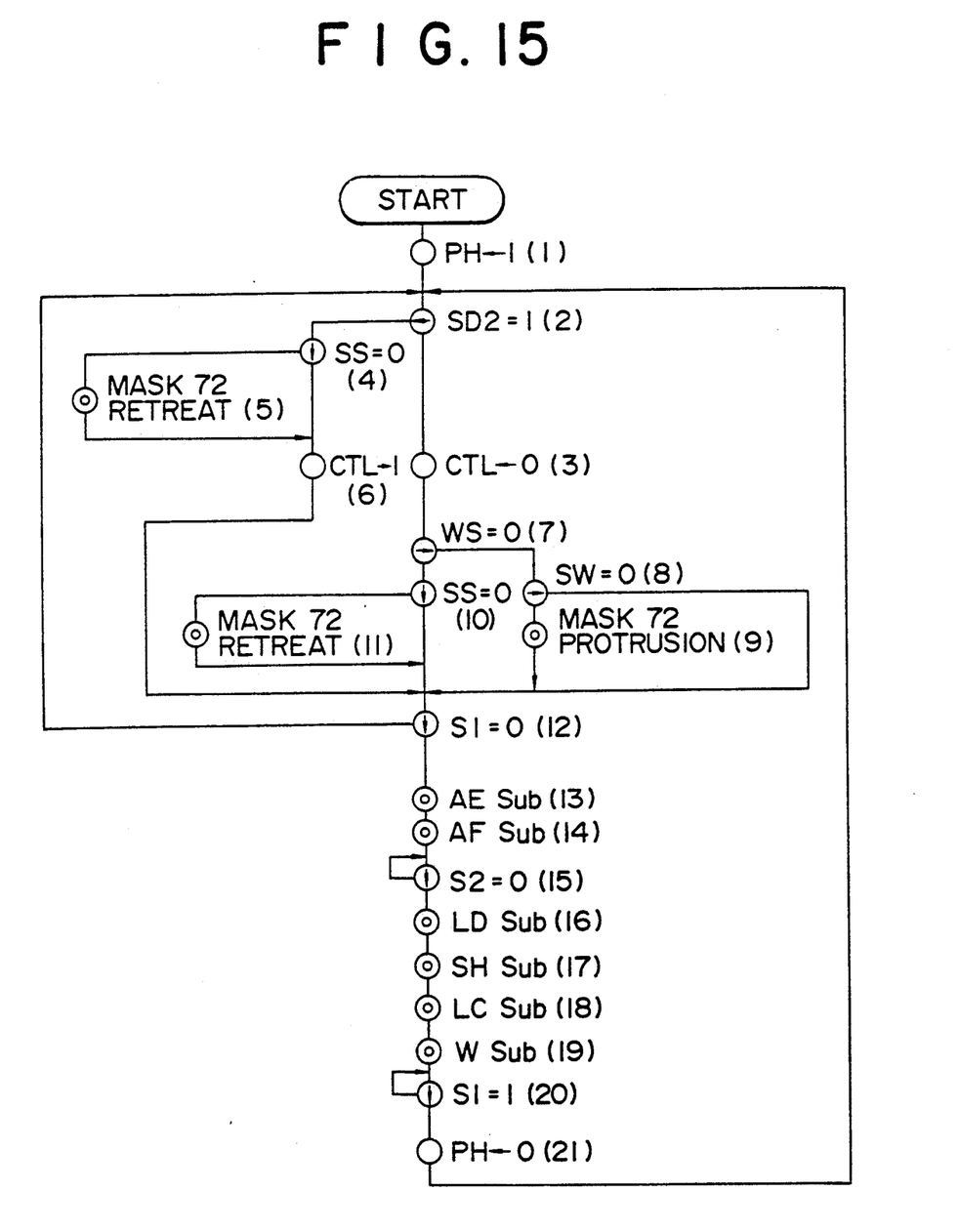
FIG. 15 is a flow chart which explains the motions of the second example.

Referring to FIG. 15, when S1=1 (20), the output terminal PH is set at "0" (21) and the process is returned to the step (2).

The above-described two examples are related to the camera provided with the data registration coupled with film winding. However, as described above, the present invention is not limited to the specific type of camera but it can be applied to the conventional type of camera.

As explained above, in the present invention, the portion of a film which is shaded by a light decreasing means can be changed according to the number of characters to be registered, so that the light decreasing means can function properly. As a result, the following disadvantages can be eliminated: a photograph does not look well because of the light decreasing means; and the subject portion is unnecessarily covered by a mask. Further, a means to indicate the relative position shaded by the light decreasing means, is provided in a view finder, so that a photographer can conduct effective framing, taking the shaded portion into consideration.

What is claimed is:

1. A camera for recording identification data and a subject image on a photographic film, wherein the identification data is superimposed on the subject image within a predetermined area of the photographic film, the camera comprising:

input means for inputting identification data by sequentially selecting a number of characters, said number of characters being restricted to be not larger than a predetermined number;

means for forming an optical image of the identification data on the surface of the photographic film in an imprint area within the predetermined area, the size of the imprint area being variable and corresponding to said number of selected characters;

film masking means for masking at least a portion of said predetermined area for decreasing illuminance of the subject image in the area masked by said film masking means by masking a portion of incoming light of the subject through an optical path; and control means coupled to the film masking means for controlling the film masking means to variably control the size of the area masked by said film masking means such that the masked area corresponds in size to the size of said imprint area.

2. The camera of claim 1, further comprising:

view-finder masking means for displaying the imprint area in a view finder of the camera, said view-finder masking means variably masking an area of the view finder corresponding to the masked area of the photographic film, thereby decreasing the illuminance of the subject image in the masked area of the view finder.

3. The camera of claim 1, wherein the film masking means comprises a movable film masking member coupled to a driver, said driver being controlled by the control means to drive the film masking member to provide to a variable film masking position corresponding to the size of the imprint area, thereby masking the imprint area.

4. The camera of claim 3, further comprising:

a view-finder masking member adapted to be protruded to a view-finder masking position to variably mask a view-finder masking area within a view finder of the camera to thereby decrease the illuminance of the subject image in the masked area of the view-finder; and linkage means for coupling the view-finder masking member to the film masking member and for establishing a proportional displacement relationship between the view-finder masking position and the film masking position.

5. The camera according to claim 1, wherein said film masking means comprises a long mask member and a short mask member, both of said long and short mask members being coupled to a driver, said driver being controlled by the control means to drive said long and short mask members to variable film masking positions to variably mask the imprint area.

6. The camera according to claim 1, further comprising means responsive to said number of selected characters being less than a given number for winding said photographic film by the length of a frame after said means for forming an optical image of the identification data forms said identification data on said imprint area of said photographic film.

7. The camera according to claim 6, wherein said film masking means comprises a long mask member and a short mask member, both of said long and short mask members being coupled to a driver, said driver being controlled by the control means to drive said short mask member to a film masking position to mask the imprint area when said number of selected characters is less than said given number.

8. The camera of claim 1, further comprising means responsive to said number of selected characters being greater than a given number for winding said photographic film by the length of half a frame after said means for forming an optical image of the identification data forms a part of said identification data on said imprint area of said photographic film, and for further winding said photographic film by the length of half a frame after said means for forming an optical image of the identification data forms a remaining part of said identification data on said imprint area of said photographic film.

9. The camera according to claim 8, wherein said film masking means comprises a long mask member and a short mask member, both of said long and short mask members being coupled to a driver, said driver being controlled by the control means to drive said long mask to a film masking position to mask the imprint area when said number of selected characters is greater than said given number.

10. The camera according to claim 4, wherein said viewfinder masking member comprises a short viewfinder mask and a long view-finder mask both of said long and short view-finder masks being coupled to said driver of said film masking means.

* * * * *